(No Model.)

A. TACHE.
CHALK LINE HOLDER.

No. 472,593. Patented Apr. 12, 1892.

ATTEST.
J. Henry Kaiser
Joseph C. Stack

INVENTOR.
Augustus Tache.
By
Atty.

UNITED STATES PATENT OFFICE.

AUGUSTUS TACHE, OF SAN FRANCISCO, CALIFORNIA.

CHALK-LINE HOLDER.

SPECIFICATION forming part of Letters Patent No. 472,593, dated April 12, 1892.

Application filed August 8, 1891. Serial No. 402,134. (No model.)

*To all whom it may concern:*

Be it known that I, AUGUSTUS TACHE, a citizen of the United States of America, residing at San Francisco, in the county of San Francisco and State of California, have invented certain new and useful Improvements in Chalk-Line Holders, of which the following is a specification, reference being had therein to the accompanying drawings.

The object of my invention is to provide a simple, durable, and cheap means for stopping the spool carrying the chalk-line and holding it at any desired point and for anchoring the chalk-line holder in any substance that will receive a pointed instrument.

Figure 1:
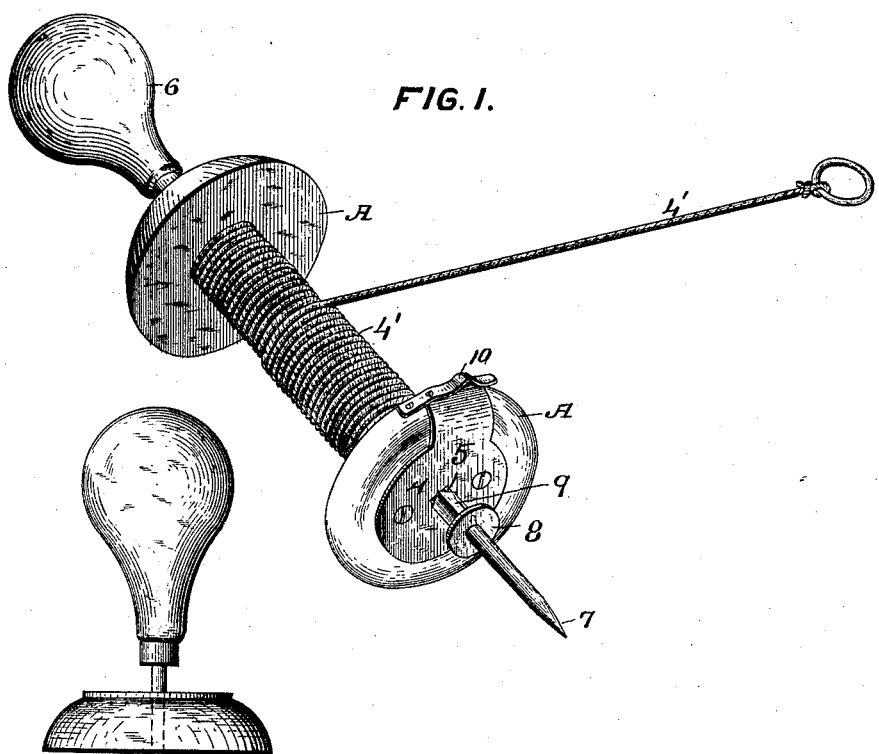
Figure 2:
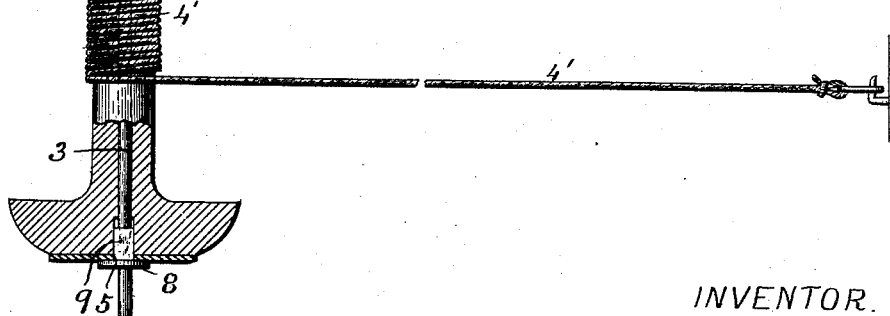

In the drawings, Figure 1 is a perspective view of my invention in position for release of the chalk-line, and Fig. 2 is an elevation thereof, partly in section, showing spool stopped and chalk-line holder anchored.

Like letters and figures refer to the same parts throughout the several views.

The spool A is mounted and rides upon spindle 3, carrying the chalk-line 4'. The lower end of the spool is provided with a metallic plate 4, having a rectangular opening conforming in its location with the axial bore of the spool, through which the spindle passes. The spindle 3 has handle 6 attached at its upper end and projects through and beyond the spool, being pointed at its lower end at 7 and having the button 8 located near the end of the spindle most remote from the handle. Above the button 8 the spindle is rectangular for a short distance. This rectangular shoulder 9 fits into the rectangular opening 5 in the plate 4, which extends into end of spool the length of the shoulder 9. The shoulder and opening may, however, be triangular or of any shape that will prevent the revolution of the spool upon the spindle when the shoulder is brought within the opening. The button 8 is so located with reference to its distance from the handle 6 that the spool will have play longitudinally of the spindle a little in excess of the space occupied by the rectangular shoulder 9, and it also forms a bearing for the spool when stopped. The catch 10 is provided for the purpose of fastening the free end of the chalk-line when not in use or when the chalk-line holder is being transported.

In operation the free end of the chalk-line is released from the clasp, the spool is moved toward the handle far enough to escape the rectangular shoulder and revolve freely upon the spindle. The chalk-line is then unwound. When it is desired to stop unwinding and hold the spool, the spool is moved down so as to contact with the rectangular shoulder 9, and its revolution is arrested, and it is held in the position where arrested until released. This may be accomplished by gravity. The chalk-line holder may be anchored by inserting the pointed end of the spindle into any substance adapted to receive and hold it. The pointed end of the spindle 3 may be used as a scribe-awl.

Having thus described my invention, what I claim, and desire to secure by Letters Patent, is—

1. In a chalk-line holder, the combination of the spool A, held to slide longitudinally upon the spindle to engage and disengage the rectangular shoulder and the spool having metallic plate 4, with rectangular opening therein conforming in its location with the axial bore of the spool, the spindle 3, having rectangular shoulder 9 and pointed end 7, and button 8, as and for the purposes specified.

2. In a chalk-line holder, the combination of a spool held to slide longitudinally upon the spindle to engage and disengage the rectangular shoulder and the spool having a plate at one end thereof, with a rectangular opening therein conforming in its location with the axial bore of the spool, a spindle having a rectangular shoulder to fit the opening in the plate, and a button located upon the spindle near the end thereof most remote from the handle, forming a bearing for the spool when stopped, as and for the purposes set forth.

3. In a chalk-line holder, the combination of the spool A, held to slide longitudinally upon the spindle to engage and disengage the rectangular shoulder and the spool having metallic plate 4, with rectangular opening therein conforming in its location with the axial bore of the spool, the spindle 3, having rectangular shoulder 9, the button 8, located on the spindle near the end thereof most remote from the handle, forming a bearing for the spool when stopped, and the handle 6, as and for the purposes set forth.

4. In a chalk-line holder, the combination of the spool A, held to slide longitudinally upon the spindle to engage and disengage the rectangular shoulder and the spool having a rectangular opening therein conforming with the axial bore of the spool, the spindle 3, having rectangular shoulder 9, the chalk-line 4', and the catch 10, as and for the purposes set forth.

In testimony whereof I affix my signature in presence of two witnesses.

AUGUSTUS TACHE.

Witnesses:
 L. PATTERSON,
 BARTHOLOMEW NOYES.